(12) United States Patent
Helmick et al.

(10) Patent No.: US 9,710,344 B1
(45) Date of Patent: Jul. 18, 2017

(54) LOCALITY BASED QUORUM ELIGIBILITY

(75) Inventors: Michael T. Helmick, Seattle, WA (US);
Jakub Kulesza, Bellevue, WA (US);
Stefano Stefani, Issaquah, WA (US);
David A. Lutz, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 622 days.

(21) Appl. No.: 12/966,025

(22) Filed: Dec. 13, 2010

(51) Int. Cl.
*G06F 7/00* (2006.01)
*G06F 17/00* (2006.01)
*G06F 11/20* (2006.01)

(52) U.S. Cl.
CPC ...... *G06F 11/2028* (2013.01); *G06F 11/2097* (2013.01)

(58) Field of Classification Search
CPC .......... G05B 19/427; G05B 2219/1215; G05B 2219/2231; G05B 2219/2234; G05B 2219/2237; G05B 2219/31179; G05B 2219/24181; G05B 2219/25214; G06F 11/2028; G06F 17/30348; G06F 11/2097
USPC ........ 707/610, 623, 629, 634; 709/201, 203, 709/208–211, 221; 714/2, 11, 44, 55
See application file for complete search history.

(56) References Cited

U.S. PATENT DOCUMENTS

| | | | |
|---|---|---|---|
| 6,823,355 B1 * | 11/2004 | Novaes et al. | 709/201 |
| 7,856,480 B2 * | 12/2010 | Muchow | 709/208 |
| 2003/0014462 A1 * | 1/2003 | Bennett et al. | 709/100 |
| 2003/0126265 A1 * | 7/2003 | Aziz | G06F 9/45504 709/227 |
| 2005/0237926 A1 * | 10/2005 | Cheng | H04L 43/0817 370/216 |
| 2005/0262382 A1 * | 11/2005 | Bain | G06F 9/52 714/4.4 |
| 2006/0085507 A1 * | 4/2006 | Zhao | G06Q 10/10 709/206 |
| 2011/0099146 A1 * | 4/2011 | McAlister | G06F 11/3006 707/634 |

* cited by examiner

*Primary Examiner* — Jason Liao
*Assistant Examiner* — Berhanu Mitiku
(74) *Attorney, Agent, or Firm* — Thomas | Horstemeyer, LLP

(57) ABSTRACT

Disclosed are various embodiments for distributing data items. A plurality of nodes forms a distributed data store. A new master candidate is determined through an election among the plurality of nodes. Before performing a failover from a failed master to the new master candidate, a consensus is reached among a locality-based failover quorum of the nodes. The quorum excludes any of the nodes that are in a failover quorum ineligibility mode.

19 Claims, 7 Drawing Sheets

US 9,710,344 B1

LOCALITY BASED QUORUM ELIGIBILITY

BACKGROUND

A data store, such as, for example, a non-relational database, a relational database management system (RDBMS), or other data systems may be implemented as a distributed system. Distributed systems can offer improved reliability and availability, better fault tolerance, increased performance, and easier expansion. Some distributed models employ single-master replication, where data written to a master data store is replicated to one or more secondary stores. Distributed data stores may experience difficulties if the master data store fails.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to failover recovery in a distributed data store. In one embodiment, a distributed data store can employ a single-master replication model that provides for a master data store and one or more slave data stores. The master data store can receive updates to data items stored in the distributed data store received from client systems and propagate the updates to the slave data stores. Upon propagating the update to a requisite number of slave data stores, the master data store can then consider the update as successful, durable, and/or committed to the distributed data store. To provide data durability or integrity from a client or user point of view, any update to a data item acknowledged to the user as successful in a distributed data store according to embodiments of the disclosure should be able to survive the failure of the master data store. In such a scenario, a slave data store in the distributed data store can be designated as the new master data store.

To provide such failover capability to the distributed data store, the new master data store, previously a slave data store, must be able to determine at least the last successful updates committed to the distributed data store and acknowledge as successful to a client in order to properly assume its role as the master. Before switching over to a new master, a consensus must be reached among a failover quorum. Having seen full participation from the appropriate failover quorum, the newly elected master is guaranteed to know about all of the updates that have gained locality-based durability. Excluding nodes from the failover quorum using the techniques described herein allows the failover to proceed when those nodes might otherwise block for an arbitrary amount of time waiting for a particular node to take part in the quorum. This blocking might occur, for example, due to a node having failed or having been taken down temporarily for maintenance.

Figure 1:
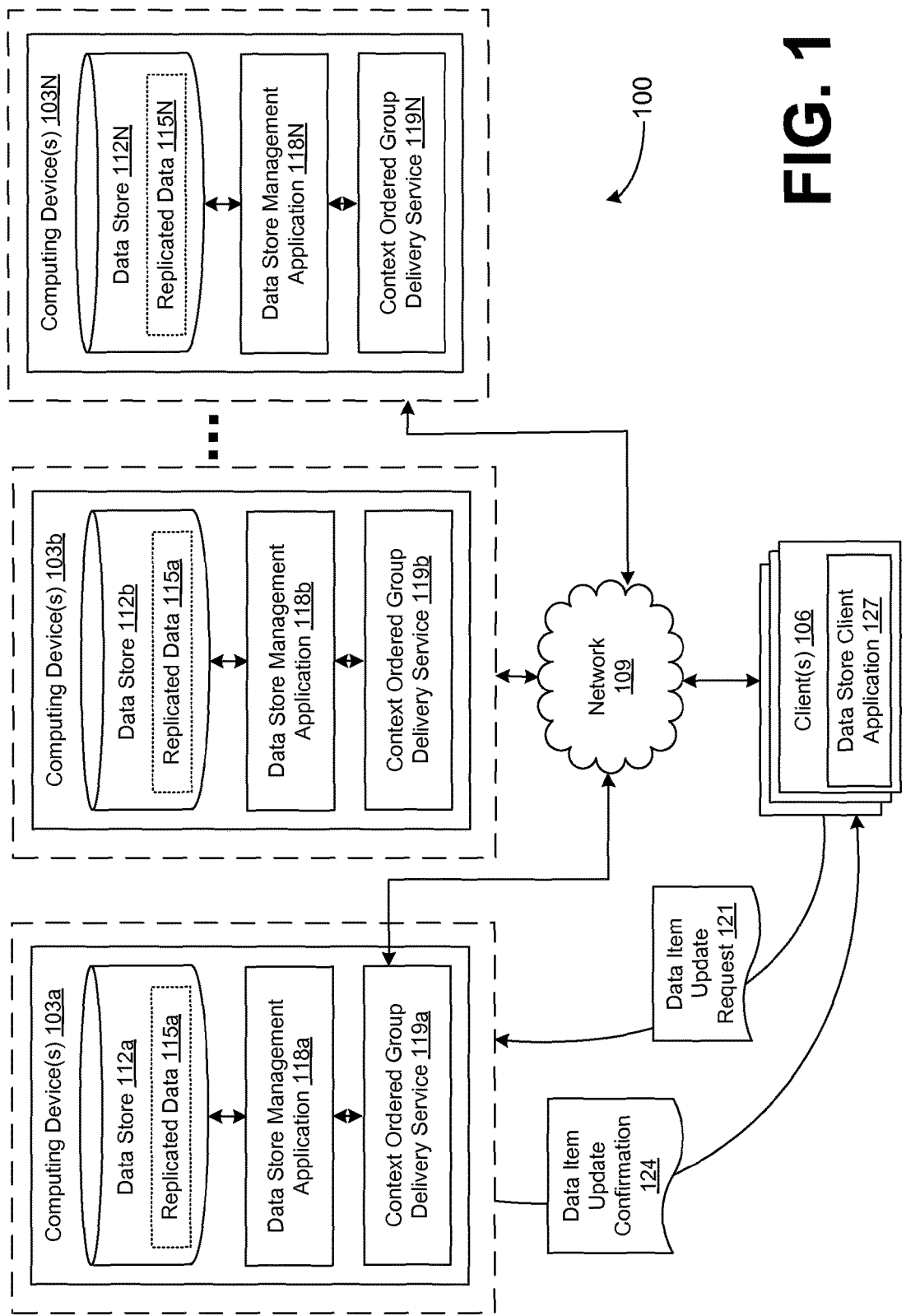
FIG. 1 is a drawing of a networked environment according to various embodiments of the present disclosure.

With reference to FIG. 1, shown is a networked environment 100 according to various embodiments. The networked environment 100 includes one or more computing devices 103a . . . 103N in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

Each of the computing devices 103a . . . 103N may comprise, for example, a server computer or any other system providing computing capability. Alternatively, a plurality of computing devices 103a . . . 103N may be employed that are arranged, for example, in one or more server banks or computer banks or other arrangements. A plurality of computing devices 103a . . . 103N together may comprise, for example, a cloud computing resource, a grid computing resource, and/or any other distributed computing arrangement. Such computing devices 103a . . . 103N may be located in a single installation or may be distributed among many different geographical locations. For purposes of convenience, the computing device 103 is referred to herein in the singular. Even though the computing device 103 is referred to in the singular, it is understood that a plurality of computing devices 103a . . . 103N may be employed in the various arrangements as described above.

Various applications and/or other functionality may be executed in the computing device 103 according to various embodiments. Also, various data is stored in a respective data store 112a . . . 112N that is accessible to the computing device 103. The respective data store 112a . . . 112N may be representative of a plurality of data stores as can be appreciated. The data stored in the data store 112, for example, is associated with the operation of the various applications and/or functional entities described below. The data stored in a data store 112 includes, for example, replicated data 115 and potentially other data. The replicated data 115 includes any data maintained in the data store 112 that can be durably persisted across a distributed data store implemented by the various computing devices 103 in the system.

The components executed on the computing device 103, for example, include a data store management application 118, context ordered group delivery service 119, and other applications, services, processes, systems, engines, or functionality not discussed in detail herein. The context ordered group delivery service 119 guarantees that every node processes a particular message by first processing every other message which the particular message depends on. In other words, context ordered group delivery service 119 guarantees that the message context graph is always a directed acyclical graph.

When a computing device 103 is designated as a master data store for a distributed data store implemented by computing devices 103a . . . 103N, the data store management application 118 takes on a master role and is thus executed to manage the data store 112 and to facilitate replication of data to one or more data stores 112 accessible to computing devices 103 that are designated as slave data stores. In a master role, the data store management application 118 may obtain data item update requests 121 from the client device 106 and respond with data item update confirmations 124. The updates may take the form of writes to the data store 112, for example. The master data store management application 118 may also generate and send data item replication requests to the slave data store management applications 118 and obtain data item replication confirmations from the slave data store management applications 118.

When a computing device 103 is designated as a slave data store for a distributed data store implemented by computing devices 103a . . . 103N, the data store management application 118 takes on a slave role and is thus executed to receive data item replication requests from a master data store management application 118 and cause the corresponding data item to be stored in the data store 112 managed by the slave data store management applications 118. In other words, the slave data store management applications 118 are each configured to obtain data item replication requests from the master data store management application 118. In response to the data item replication requests, the slave data store management application 118 is configured to commit data item updates to its respective data store 112a . . . 112N and then generate and send data item replication confirmations to the master data store management application 118.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a data store client application 127 and other applications. The data store client application 127 may be executed in a client device 106, for example, to facilitate interaction with the data store management application 118. In one embodiment, the data store client application 127 may be configured, for example, to access and render network pages, such as web pages, or other network content served up by the computing device 103, a web server, a page server, or other servers for the purpose of interfacing with the data store management application 118. The client device 106 may be configured to execute applications beyond the data store client application 127 such as, for example, browser applications, email applications, instant message applications, and/or other applications.

In various embodiments, the data store client application 127 may comprise a thin client application, a thick client application, or another type of client application. Some embodiments may include a graphical user interface and/or a command-line interface. In some embodiments, the client device 106 can be configured to interact with a distributed data store provided by the computing devices 103a . . . 103N via an application programming interface (API) provided by the data store management application 118 executed in a master data store or slave data store.

A data item update request 121 is generated by a data store client application 127. Although the data store client application 127 is described as executed in a client device 106, it is understood that the client device 106 may correspond to a server computer that processes business logic, generates network pages, and/or performs other tasks. Thus, although a user may generate a data item update request 121 through a user interface, a data item update request 121 may also be generated automatically by business logic applications, workflow engines, network page generation applications, and/or other applications.

The data item update request 121 may correspond to a portion of another application, such as, for example, a module, a library, etc. in various embodiments. The data item update request 121 may be sent over the network 109 to the data store management application 118 using hypertext transfer protocol (HTTP), simple object access protocol (SOAP), remote procedure call (RPC), remote method invocation (RMI), representational state transfer (REST), Windows Communication Foundation, and/or other frameworks and protocols. In various embodiments, the data item update request 121 may describe updates to data items by using, for example, structured query language (SQL), extensible markup language (XML), JavaScript object notation (JSON), yet another markup language (YAML), and/or other formats.

Figure 2:
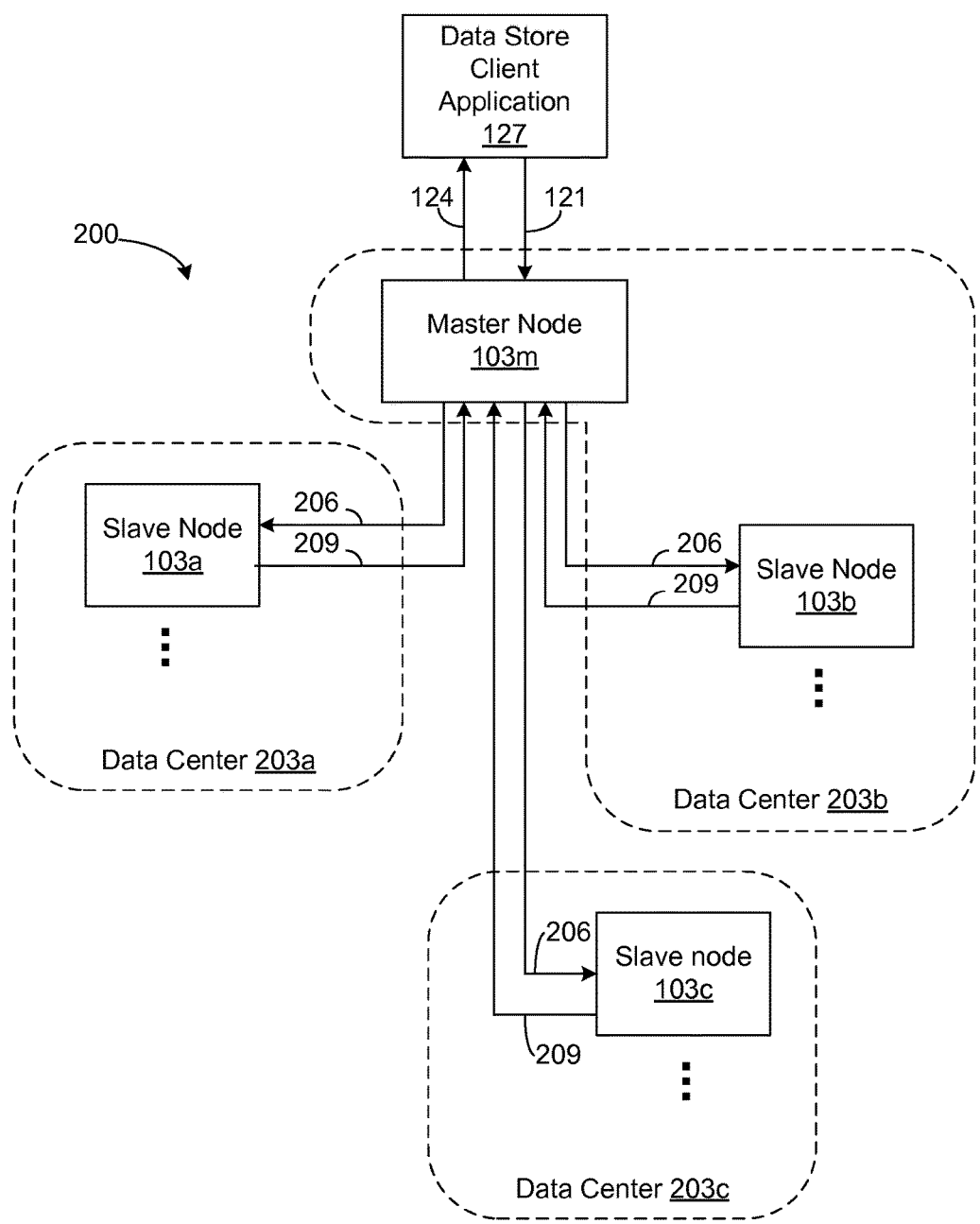
FIG. 2 is another view of the networked environment of FIG. 1 according to various embodiments of the present disclosure.

Turning now to FIG. 2, shown is another view of the networked environment 100 (FIG. 1). Where FIG. 1 focused on structure of the components, FIG. 2 focuses on how the computing devices 103a . . . 103N are distributed among physical locations. The computing devices 103a . . . 103N may be referred to herein as nodes 103 or replicated nodes. Together, nodes 103 function as a distributed data store 200. Each computing device 103 resides at a particular physical location, and these locations can be grouped into availability zones. A collection of computing devices 103 which all reside at the same physical location (e.g., building, campus, etc.) is commonly referred to as "data center." The example networked environment 100 of FIG. 2 includes three data centers 203a, 203b, 203c. Availability zones and/or data centers are geographically separated to some degree, but the degree of separation may vary. That is, availability zones and/or data centers can be distributed across a town, across a city, across a country, across the world, etc. Such distribution provides for greater stability of a distributed data store 200 so that if a catastrophic event occurs in one location and may affect a subset of the nodes 103 in the distributed data store 200, the catastrophic event does not jeopardize the system as a whole.

As noted above, at any point in time one node 103 acts as a master and the other nodes 103 act as slaves. In the example networked environment 100 of FIG. 2, node 103m is the master node while nodes 103a, 103b and 103c are slave nodes. The master node 103m is located at data center 203a, as is slave node 103a. Slave node 103b is located at data center 203b and slave node 103c is located at data center 203c. It should be appreciated that a networked environment 100 can include any number of data centers, a data center 203 can include any number of nodes, and the master node can reside at any data center 203.

An overview of the operation of distributed data store 200 will now be provided. A data store client application 127 executing on a client device 106 generates a data item update request 121. The data item update request 121 is received by the master node 103m. The master node 103m sends a data item replication request 206 to the slave nodes 103a, 103b and 103c. The data item update request 121 may be an actual replica of the originally received data item update request 121, a separate request including some or all of the information in the originally received data item update request 121, or other variations as should be appreciated.

After processing the data item replication request 206, the slave nodes 103a, 103b and 103c each send a data item replication acknowledgement 209 back to the master node 103m. After receiving a predefined quorum of acknowledgements 209, the master node 103m responds to the data store client application 127 with a data item update confirmation 124. The quorum required to send out this data item update confirmation 124 is referred to herein as a durability quorum. In some embodiments, the durability quorum is a locality-based durability quorum, as described in the co-owned and co-pending patent application "Locality Based Quorums" having U.S. application Ser. No. 12/967,187, which is hereby incorporated by reference in its entirety.

The distributed data store 200 includes features which facilitate recovery upon failure of the master node 103m. A failure can be represented by a hardware failure of some kind, an abnormal termination of the data store management application 118, and/or other failure as can be appreciated. Therefore, the remaining computing devices 103 executing an instance of the data store management application 118 can elect a new master node by employing a consensus algorithm. In some embodiments, the data store management application 118 executed in the various computing devices 103 can be configured to collectively employ a Paxos election scheme in order to determine the identity of the computing device 103 that will serve as the master. The election of a master among the various computing devices 103 in the distributed data store 200 can also be determined by other methods of reaching consensus in a distributed system of peers as can be appreciated. The quorum required in the election of a new master is a locality-based failover quorum, described below in connection with FIG. 3.

Figure 3:
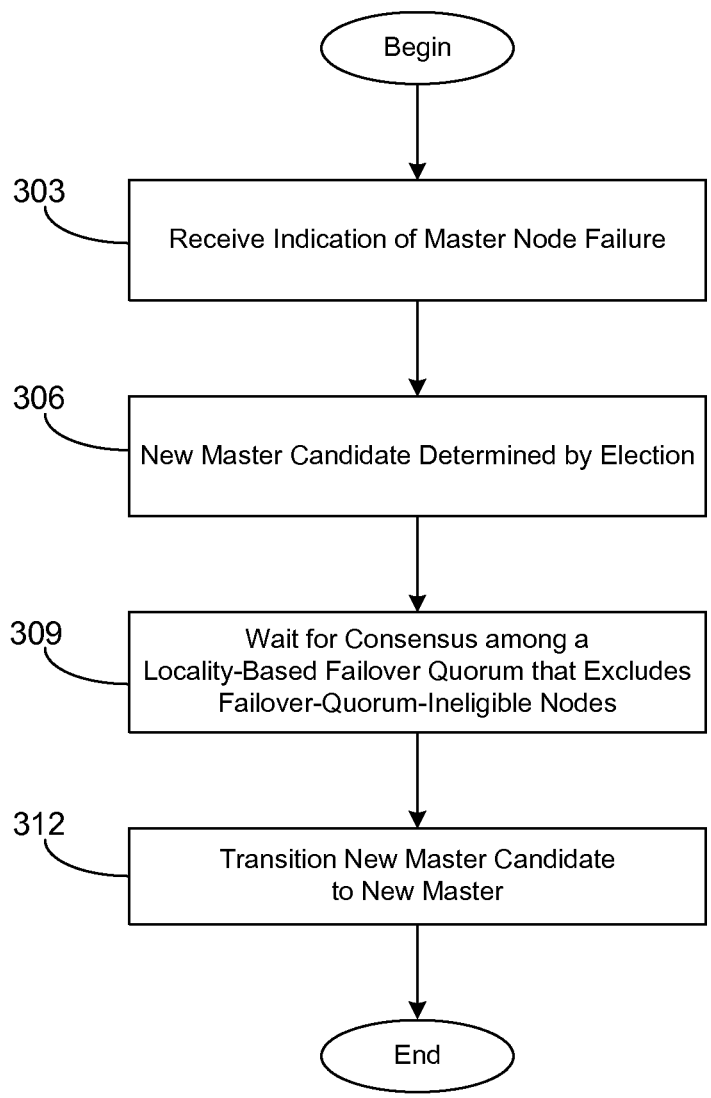
FIG. 3 is a flowchart illustrating an example of functionality implemented as portions of a data store management application executed in a computing device in the networked environment of FIG. 1 according to various embodiments of the present disclosure.

Referring next to FIG. 3, shown is a flowchart that provides one example of the operation of a portion of the data store management application 118 (FIG. 1) according to various embodiments. In particular, the flowchart of FIG. 3 illustrates aspects of a failover process for a distributed data store. It is understood that the flowchart of FIG. 3 provides merely an example of the many different types of functional arrangements that may be employed to implement the operation of the portion of the data store management application 118 as described herein. As an alternative, the flowchart of FIG. 3 may be viewed as depicting an example of steps of a method implemented in the computing device 103 (FIG. 1) according to one or more embodiments.

Beginning at box 303, the data store management application 118 (FIG. 1) receives an indication that the master node 103m has failed. The indication may take the form of a timeout, a message from the master node, a message from another node, or any other suitable implementation. Next at box 306, a new master candidate is determined by an election among nodes 103 other than the failed master node 103m. The election employs a consensus algorithm as described above. Before acting as the master (e.g., before receiving data item update requests 121 from clients), at box 309 the data store management application 118 on the newly elected master node 103 waits for consensus among a locality-based failover quorum that excludes any node that is failover-quorum-ineligible. As used herein, locality-based failover quorum is defined as participation from all nodes 103 in N-K-1 data centers 203. However, nodes that are known to be failover-quorum-ineligible are ignored by the data store management application 118 when seeking this quorum. Without this feature, the wait for the failover quorum could block for an arbitrary amount of time waiting for a particular node to take part in the quorum. This situation might occur, for example, due to a node having failed or having been taken down temporarily for maintenance.

Having seen full participation from the appropriate quorum of data centers 203 at box 309, the newly elected master is guaranteed to know about all of the updates 121 that have gained locality-based durability. In some embodiments, the newly elected master ensures that all data discovered during the wait for consensus (box 309) is locality-based durable before transitioning to master. Locality-based durability is described in the co-owned and co-pending patent application "Locality Based Quorums" having U.S. application Ser. No. 12/967,187. At some point after consensus is reached in box 309, the data store management application 118 executing on the newly elected master node 103 transitions at box 312 from a new master candidate to the master and thus receives data item update requests 121 from clients. The process of FIG. 3 is then complete.

As described above, locality-based quorum used during failover excludes any node that is failover-quorum-ineligible. Several methods of transitioning failover-quorum-ineligible mode and failover-quorum-eligible mode will be described in more detail in connection with FIGS. 4, 5, and 6. Another method involves a system operator sending out an eligible or non-eligible message on behalf of a node that is, for example, unresponsive.

Figure 4:
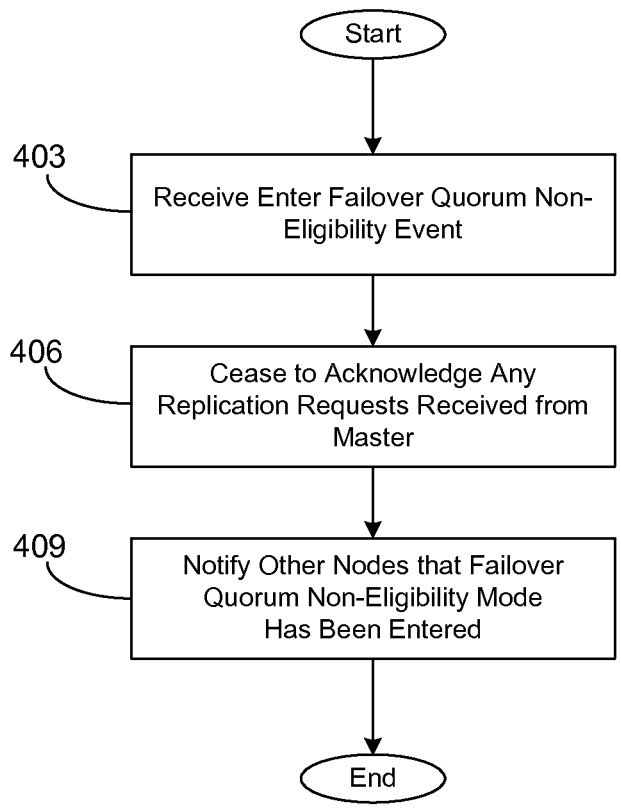
FIG. 4 is a flowchart illustrating another example of functionality implemented as portions of a data store management application executed in a computing device in the networked environment of FIG. 1 according to various embodiments of the present disclosure.

Turning now to FIG. 4, shown is a flowchart that provides additional description of node ineligibility for the failover quorum from FIG. 3, according to various embodiments. It is understood that the flowchart of FIG. 4 provides merely an example of the many different types of functional arrangements that may be employed to implement the operation of the portion of the data store management application 118 (FIG. 1) as described herein. As an alternative, the flowchart of FIG. 4 may be viewed as depicting an example of steps of a method implemented in the computing device 103 (FIG. 1) according to one or more embodiments.

Beginning at box 403, the data store management application 118 (FIG. 1) receives an event indicating the node should enter failover-quorum-non-eligibility mode. The event may occur during a graceful shutdown, may occur as a result of system operator intervention, or any other suitable trigger. Upon learning that the node should no longer participate in the failover quorum, at box 406 the master data store management application 118 stops sending acknowledgements (209 in FIG. 2) for data item replication requests 206 (FIG. 2) from the master node 103m (FIG. 1). As explained above, outside of failover-quorum-non-eligibility mode the node does receive, process, and then acknowledge these data item replication requests 206 from the master node 103m. However, as long as the node is in failover-quorum-non-eligibility mode, no such acknowledgements 209 will occur. At box 409, after ceasing acknowledgements 209, the data store management application 118 notifies the other nodes in the distributed data store 200 (FIG. 2) that this node is not eligible for the failover quorum. The process of FIG. 4 is then complete.

The data item replication requests 206, data item replication acknowledgements 209 and notifications (box 409) all utilize context-ordered group delivery service 119 (FIG. 1). The delivery service 119 guarantees that every node processes a particular message by first processing every other message which the particular message depends on. In other words, the message context graph is always a directed acyclical graph.

The use of context-ordered group delivery affects the processing of FIG. 4 as follows. When the node sends, at box 409, the message indicating entry of failover-quorum-non-eligibility-mode, every node that processes this message is guaranteed (by virtue of context ordered message delivery) that the sending node (the one in non-eligibility mode) will no longer be acknowledging updates from the master. This in turn means that the node in non-eligibility mode does not have any updates that need to be discovered during failover. Therefore, the other nodes can discount the non-eligible node in the failover quorum.

Figure 5:
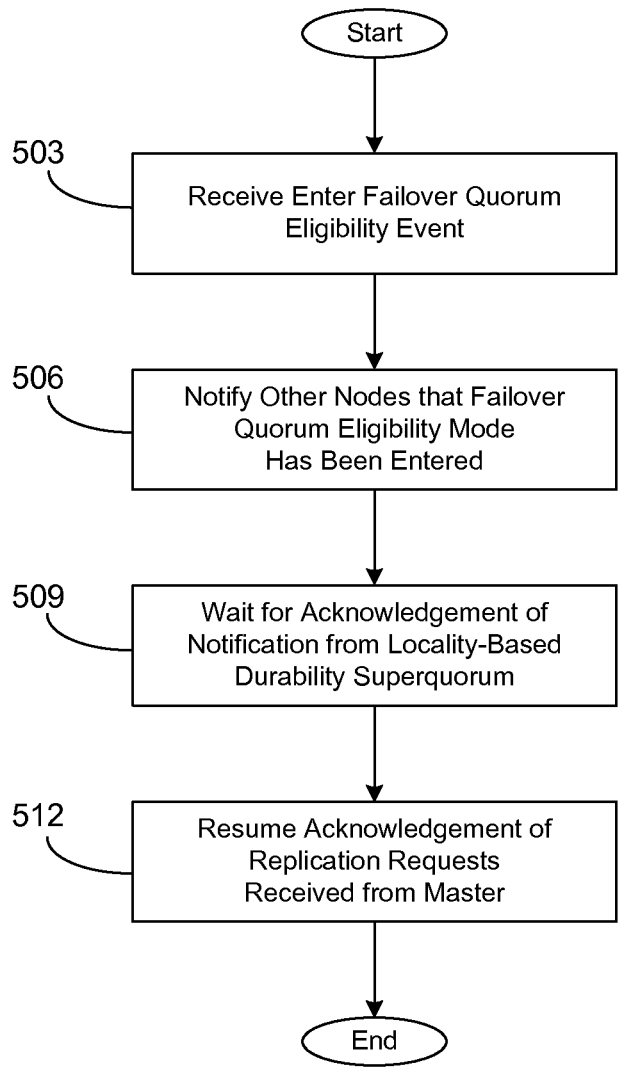
FIG. 5 is a flowchart illustrating yet another example of functionality implemented as portions of a data store management application executed in a computing device in the networked environment of FIG. 1 according to various embodiments of the present disclosure.

Moving on to FIG. 5, shown is a flowchart that provides additional description of node eligibility for the failover quorum according to various embodiments. It is understood that the flowchart of FIG. 5 provides merely an example of the many different types of functional arrangements that may be employed to implement the operation of the portion of the data store management application 118 (FIG. 1) as described herein. As an alternative, the flowchart of FIG. 5 may be viewed as depicting an example of steps of a method implemented in the computing device 103 (FIG. 1) according to one or more embodiments.

Beginning at box 503, the data store management application 118 (FIG. 1) receives an event indicating the node should enter failover-quorum-eligibility mode. The event may occur during a graceful recovery after shutdown, may occur as a result of system operator intervention, or any other suitable trigger. Upon learning that the node should return to participation in the failover quorum, at box 506 the master data store management application 118 notifies the other nodes in the distributed data store 200 (FIG. 2) that this node is once again eligible for the failover quorum.

After notification to the other nodes, at box 509 the data store management application 118 waits for acknowledgement of this notification from a locality-based durability super quorum. As defined herein, a locality-based durability quorum includes at least one node residing in each of the data centers. A locality-based durability super quorum then excludes the node which is entering the failover quorum eligibility mode (i.e., the node that sent the notification in box 506). This super quorum ensures that the node re-entering failover-quorum-eligibility mode will itself be part of the next successful failover quorum.

Next at box 512 data store management application 118 resumes sending acknowledgements (209 in FIG. 2) for data item replication requests 206 (FIG. 2) from the master node 103m (FIG. 1). As explained above, as long as the node is in failover-quorum-non-eligibility mode, no such acknowledgements 209 will occur. However, the node has now transitioned to failover-quorum-eligibility mode and so acknowledges updates as normal. The process of FIG. 5 is then complete. Like the process of FIG. 4, the process of FIG. 5 also utilizes context-ordered group delivery service 119 for data item replication requests 206, data item replication acknowledgements 209, notifications (box 506), and notification acknowledgements (box 509).

Figure 6:
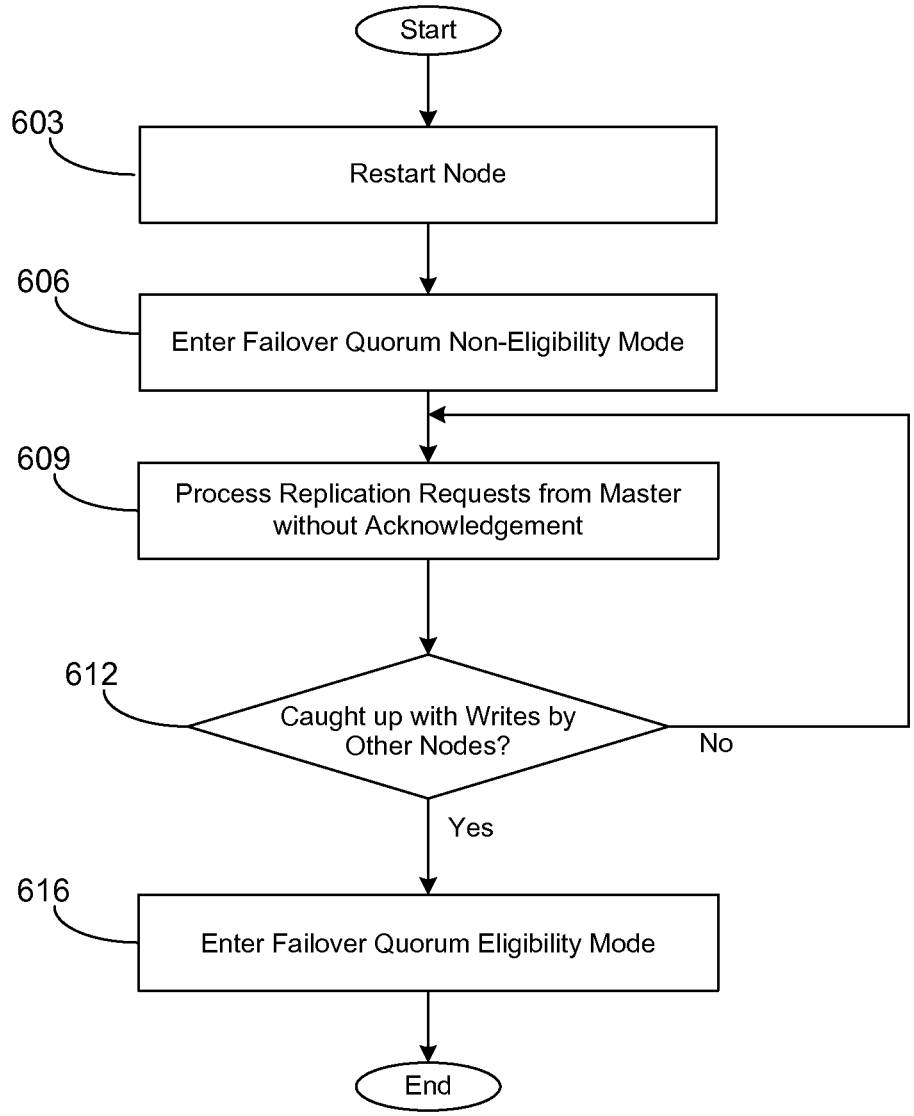
FIG. 6 is a flowchart illustrating still another example of functionality implemented as portions of a data store management application executed in a computing device in the networked environment of FIG. 1 according to various embodiments of the present disclosure.

Referring now to FIG. 6, shown is a flowchart that describes transitioning between failover quorum non-eligibility and eligibility, according to various embodiments. It is understood that the flowchart of FIG. 6 provides merely an example of the many different types of functional arrangements that may be employed to implement the operation of the portion of the data store management application 118 (FIG. 1) as described herein. As an alternative, the flowchart of FIG. 6 may be viewed as depicting an example of steps of a method implemented in the computing device 103 (FIG. 1) according to one or more embodiments.

Beginning at box 603, the node executing the data store management application 118 (FIG. 1) is restarted. This restart may occur, for example, after a graceful shutdown or an unexpected shutdown. Next, at box 606, the data store management application 118 enters failover-quorum-non-eligibility mode, described above in connection with FIG. 4. At box 609, at some later point after entering failover-quorum-non-eligibility mode after a restart, the data store management application 118 prepares for full participation as a member of the distributed data store 200 by beginning to process data item replication requests 206 received from the master node 103m.

Next, at box 612, the data store management application 118 determines whether the processed replication requests have caught up with the other nodes in the distributed data store 200. To do so, the data store management application 118 may use services provided by context-ordered group delivery service 119 to look at how many replication requests have been processed by the other nodes in the distributed data store 200, and comparing this number to the number of replicated writes that the data store management application 118 has processed itself.

If at box 612 it is determined that the data store management application 118 has not caught up with the other nodes, then the data store management application 118 returns to box 609, where further replication requests are processed. If, however, at box 612 it is determined that the data store management application 118 has caught up with the other nodes, then the data store management application 118 moves to box 616. At box 616, the data store management application 118 enters failover-quorum-eligibility mode, described above in connection with FIG. 5. The process of FIG. 6 is then complete. Like the processes of FIG. 4 and FIG. 5, the process of FIG. 6 also utilizes context-ordered group delivery service 119 for data item replication requests 206 and data item replication acknowledgements 209.

Figure 7:
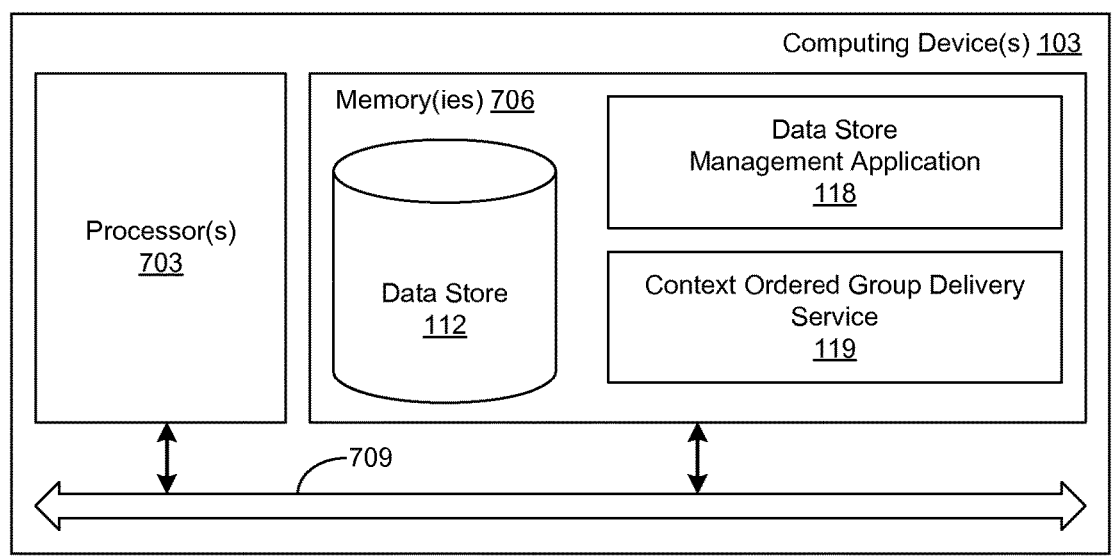
FIG. 7 is a schematic block diagram that provides one example illustration of a computing device employed in the networked environment of FIG. 1 according to various embodiments of the present disclosure.

Moving on to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the data store management application 118, context-ordered group delivery service 119, and potentially other applications. Also stored in the memory 706 may be a data store 112 and other data. In addition, an operating system may be stored in the memory 706 and executable by the processor 703. While not illustrated, the client device 106 also includes components like those shown in FIG. 7, whereby data store management application 118 is stored in a memory and executable by a processor.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors, and the memory 706 may represent multiple memories that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the data store management application 118, context-ordered group delivery service 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4, 5, and 6 show the functionality and operation of an implementation of portions of the data store management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3, 4, 5, and 6 show a specific order of execution, it is understood that the order of execution may differ from that which is depicted. For example, the order of execution of two or more blocks may be scrambled relative to the order shown. Also, two or more blocks shown in succession in FIGS. 3, 4, 5, and 6 may be executed concurrently or with partial concurrence. Further, in some embodiments, one or more of the blocks shown in FIGS. 3, 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 118 and context-ordered group delivery service 119, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, causing the computing device to at least:
    transition a respective one of a plurality of slave nodes to a failover quorum non-eligibility mode responsive to receiving a first transition event;
    cease to acknowledge, upon transition to the failover quorum non-eligibility mode, any replication requests received from a master node, the master node and the plurality of slave nodes forming a distributed data store;
    perform, after ceasing to acknowledge the replication requests, a first notification to notify the master node and at least one of a remainder of the plurality of slave nodes in the distributed data store that the failover quorum non-eligibility mode has been entered by the respective one of the plurality of slave nodes, the remainder of the plurality of slave nodes excluding the respective one of the plurality of slave nodes;
    transition from the failover quorum non-eligibility mode to a failover quorum eligibility mode responsive to receiving a second transition event;
    perform, upon transition to the failover quorum eligibility mode, a second notification to notify the at least one of the remainder of the plurality of slave nodes in the distributed data store that the failover quorum eligibility mode has been entered by the respective one of the plurality of slave nodes;
    wait, after the second notification that the failover quorum eligibility mode has been entered by the respective one of the plurality of slave nodes, for acknowledgment of the second notification from a locality-based durability super quorum which excludes the respective one of the plurality of slave nodes entering the failover quorum eligibility mode;
    resume, after waiting for the acknowledgment of the second notification, acknowledgement of the replication requests received from the master node;
    wherein individual ones of the plurality of slave nodes in the distributed data store reside at a respective data center within a plurality of data centers, the locality-based durability super quorum being made of at least one of the plurality of slave nodes residing in respective ones of the plurality data centers but excluding the respective one of the plurality of slave nodes entering the failover quorum eligibility mode.

2. The non-transitory computer-readable medium of claim 1, wherein the first transition event is a message received as part of a graceful shutdown.

3. The non-transitory computer-readable medium of claim 1, wherein the first transition event is a message originating from a system operator.

4. A method of distributing data items, comprising:
    determining a new master candidate through an election among a plurality of slave nodes forming a distributed data store;
    waiting to perform a failover from a failed master to the new master candidate until a consensus is reached among a locality-based failover quorum of the plurality of slave nodes that excludes any of the plurality of slave nodes that are in a failover quorum non-eligibility mode;
    wherein individual ones of the plurality of slave nodes in the distributed data store reside at a respective data center within a plurality of data centers, a locality-based durability super quorum being made of at least one of the plurality of slave nodes residing in respective ones of the plurality of data centers but excluding a respective one of the plurality of slave nodes entering the failover quorum eligibility mode;
    entering the respective one of the plurality of slave nodes into the failover quorum non-eligibility mode by first ceasing to acknowledge any replication requests received from a master node and then performing a first notification to notify at least one of a remainder of the plurality of slave nodes in the distributed data store of entry into the failover quorum non-eligibility mode, the remainder of the plurality of slave nodes excluding the respective one of the plurality of slave nodes; and
    entering the respective one of the plurality of slave nodes into a failover quorum eligibility mode by first performing a second notification to notify the at least one of the remainder of the plurality of slave nodes in the distributed data store of entry into the failover quorum eligibility mode, then waiting for acknowledgment of the second notification from the locality-based durability super quorum, and then resuming acknowledgement of the replication requests received from the master node.

5. The method of claim 4, wherein the locality-based failover quorum includes N-K+1 of the plurality of data centers but excludes any of the plurality of slave nodes that are in the failover quorum non-eligibility mode, wherein N is a size of the plurality of data centers and K is a durability requirement.

6. The method of claim 4, wherein the first notification, second notification, and acknowledging all utilize a context-ordered group delivery message service.

7. The method of claim 4, wherein the first notification, second notification, and acknowledging all utilize a context-ordered group message delivery service in which the message delivery is described by a directed acyclical graph.

8. The method of claim 4, further comprising:
    while in the failover quorum non-eligibility mode, processing the replication requests from the master node; and
    transitioning from the failover quorum non-eligibility mode to the failover quorum eligibility mode when the processed replication requests have caught up with the master node and the plurality of slave nodes in the distributed data store.

9. The method of claim 4, further comprising sending a message, on behalf of another respective one of the plurality of slave nodes in the distributed data store, indicating that the other respective one of the plurality of slave nodes has entered the failover quorum non-eligibility mode.

10. The method of claim 4, wherein ceasing to acknowledge any replication requests received from the master node is responsive to receiving a first transition event.

11. The method of claim 4, wherein transitioning from the failover quorum non-eligibility mode to the failover quorum eligibility mode occurs responsive to a message received from a system operator.

12. A system for distributing data items, comprising:
at least one computing device configured to at least:
cease to acknowledge any replication requests received from a master node, the master node and a plurality of slave nodes forming a distributed data store;
perform, after ceasing to acknowledge the replication requests, a first notification to notify the master node and at least one of a remainder of the plurality of slave nodes in the distributed data store that a failover quorum non-eligibility mode has been entered by a respective one of the plurality of slave nodes, the remainder of the plurality of slave nodes excluding the respective one of the plurality of slave nodes;
perform, upon a transition from the failover quorum non-eligibility mode to a failover quorum eligibility mode, a second notification to notify the master node and the at least one of the remainder of the plurality of slave nodes in the distributed data store that the failover quorum eligibility mode has been entered by the respective one of the plurality of slave nodes;
wait, after the second notification that the failover quorum eligibility mode has been entered, for acknowledgment of the second notification from a locality-based durability super quorum;
resume, after waiting for the acknowledgment of the second notification, acknowledgment of the replication requests received from the master node; and
wherein individual ones of the plurality of slave nodes in the distributed data store reside at a respective data center within a plurality of data centers, the plurality of locality-based durability super quorum being made of at least one of the slave nodes residing in respective ones of the plurality of data centers but excludes the respective one of the plurality of slave nodes entering the failover quorum eligibility mode.

13. The system of claim 12, wherein the first notification, second notification, and acknowledging all utilize a context-ordered group delivery message service.

14. The system of claim 12, wherein the first notification, second notification, and acknowledging all utilize a context-ordered group message delivery service in which the message delivery is described by a directed acyclical graph.

15. The system of claim 12, wherein the at least one computing device is further configured to at least:
process replication requests from the master node while in the failover quorum non-eligibility mode;
determine when the processed replication requests have caught up with the master node and the plurality of slave nodes in the distributed data store; and
wherein the transition from the failover quorum non-eligibility mode to the failover quorum eligibility mode occurs responsive to the determination.

16. The system of claim 12, wherein ceasing to acknowledge any replication requests received from the master node is responsive to receiving a first transition event.

17. The system of claim 12, wherein ceasing to acknowledge any replication requests received from the master node is responsive to a message received as part of a graceful shutdown.

18. The system of claim 12, wherein the transition from the failover quorum non-eligibility mode to the failover quorum eligibility mode occurs responsive to a message received from a system operator.

19. The system of claim 12, wherein the transition from the failover quorum non-eligibility mode to the failover quorum eligibility mode occurs responsive to receiving a second transition event.

* * * * *